Figure 1:
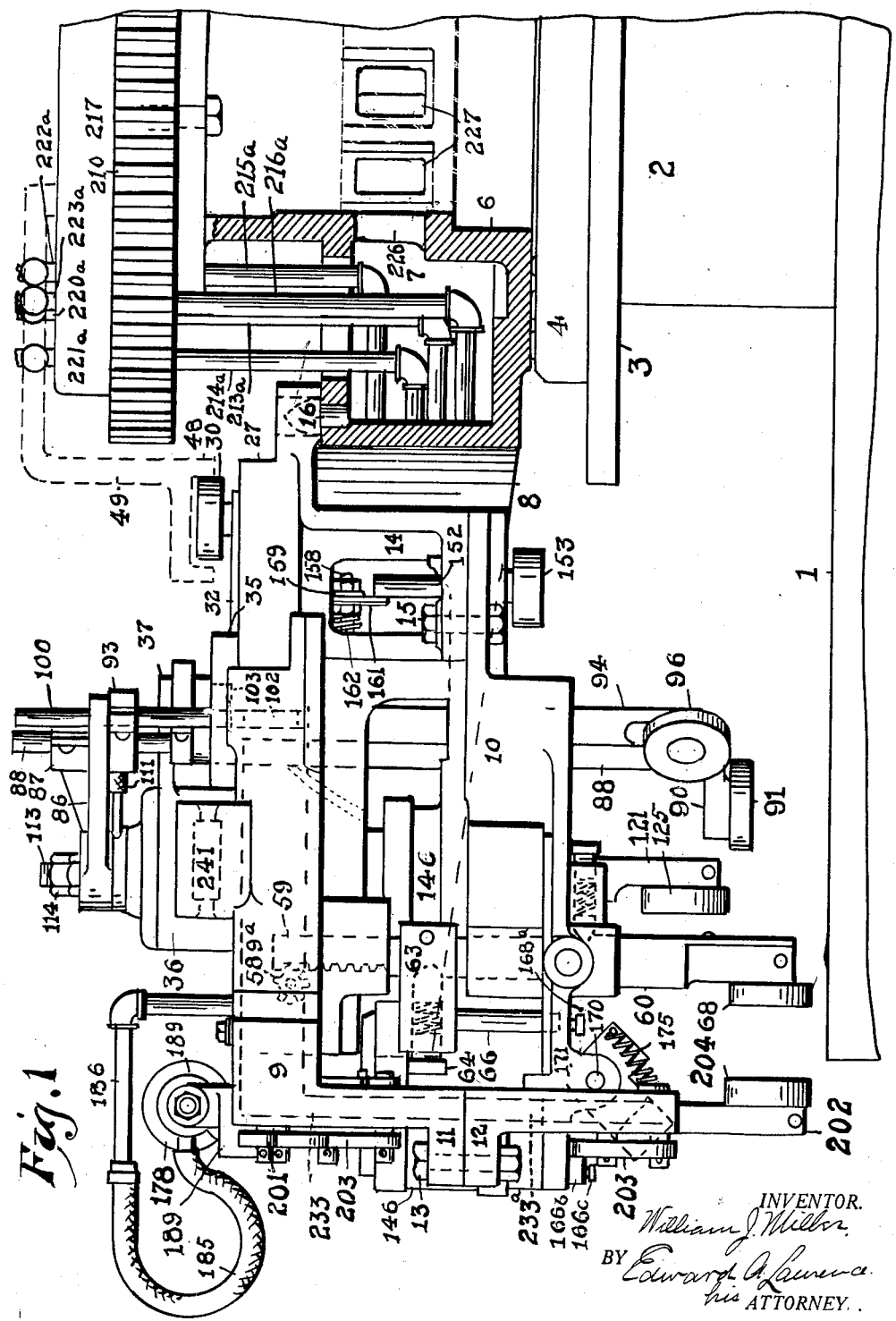

Dec. 8, 1931.        W. J. MILLER        1,835,172
GLASS FABRICATING MACHINE
Original Filed Oct. 16, 1925    9 Sheets-Sheet 1

INVENTOR.
William J. Miller
BY Edward A. Lawrence
his ATTORNEY.

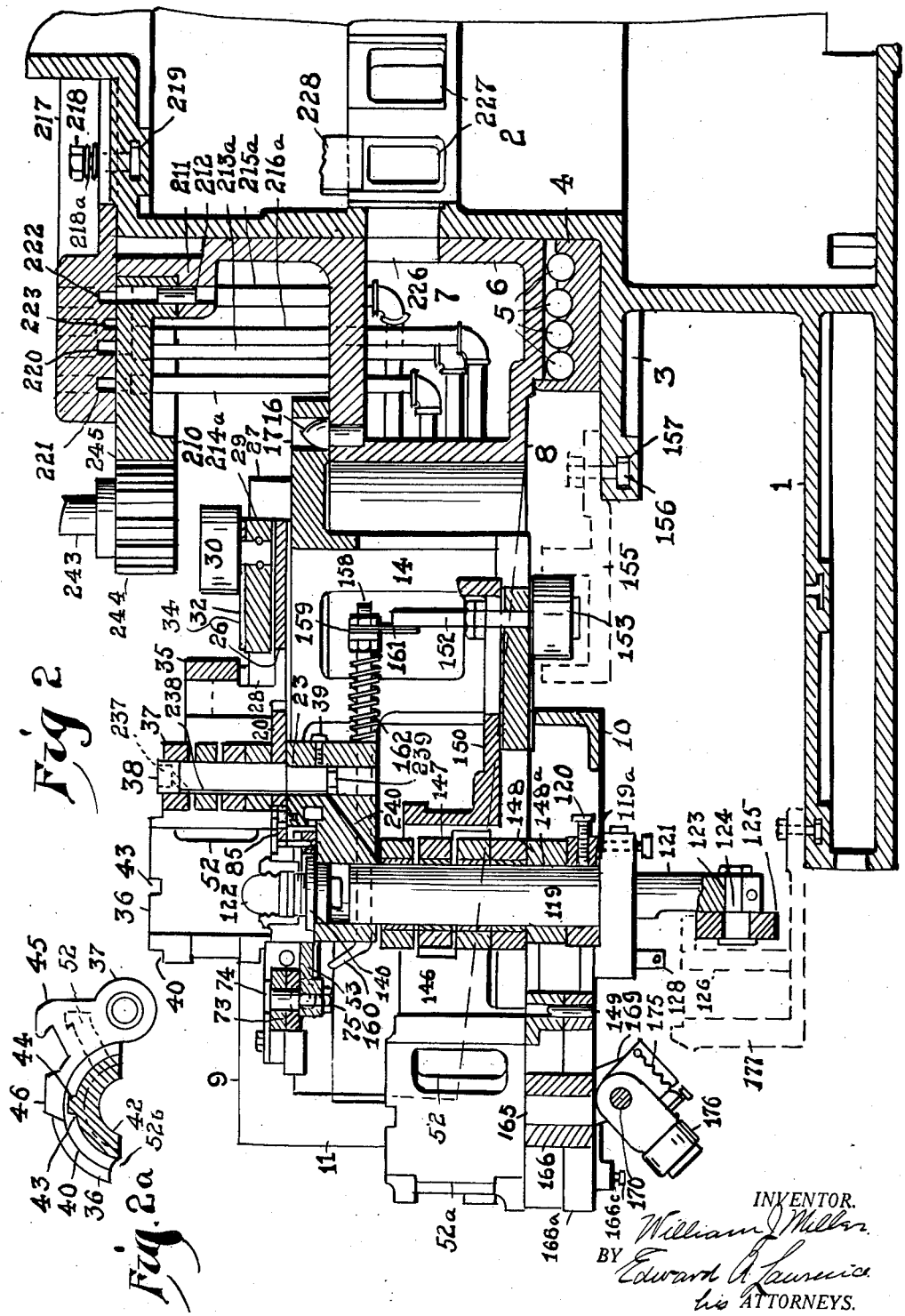

Dec. 8, 1931.     W. J. MILLER     1,835,172
GLASS FABRICATING MACHINE
Original Filed Oct. 16, 1925     9 Sheets-Sheet 3
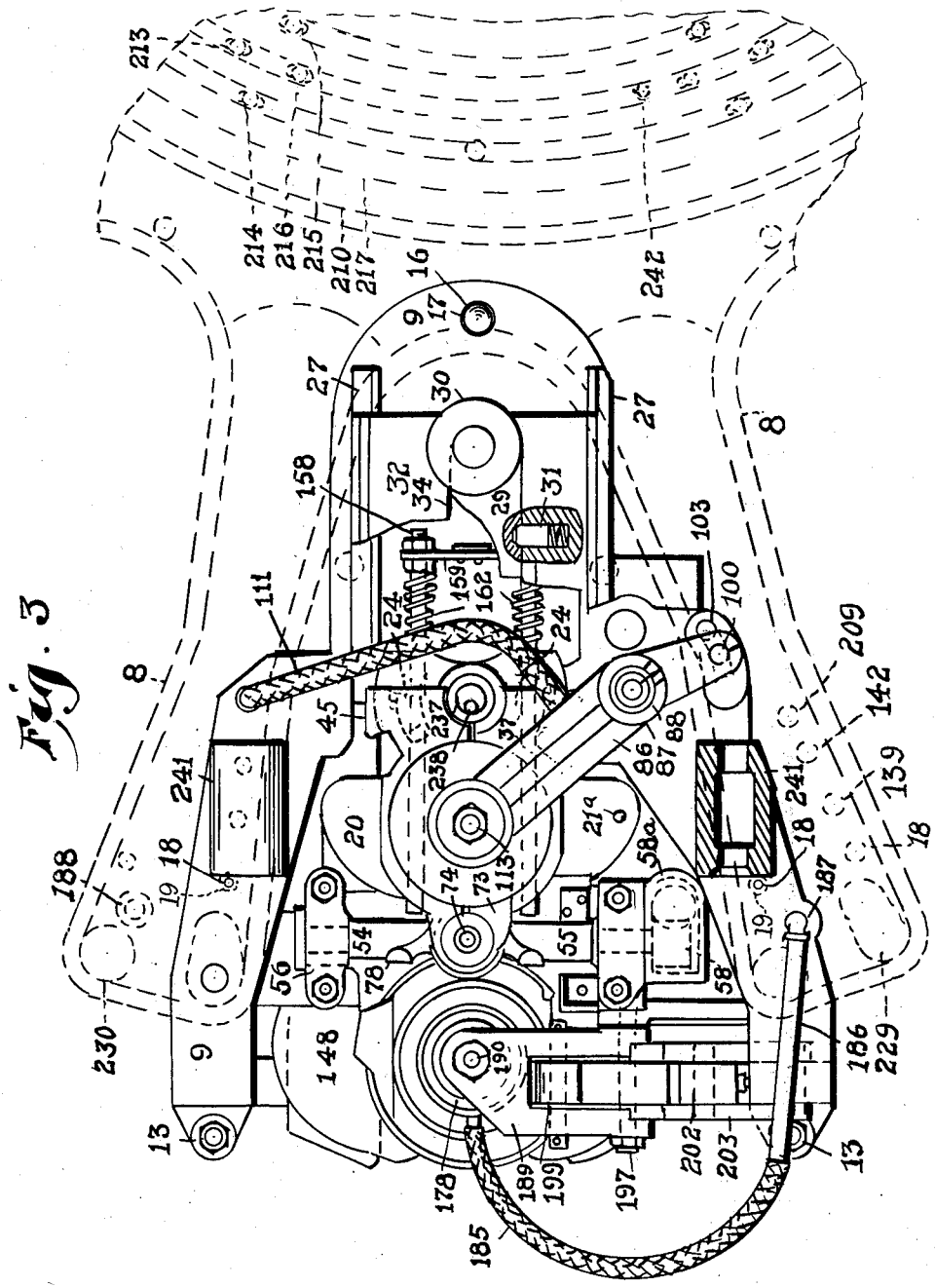

Dec. 8, 1931.  W. J. MILLER  1,835,172
GLASS FABRICATING MACHINE
Original Filed Oct. 16, 1925   9 Sheets-Sheet 4
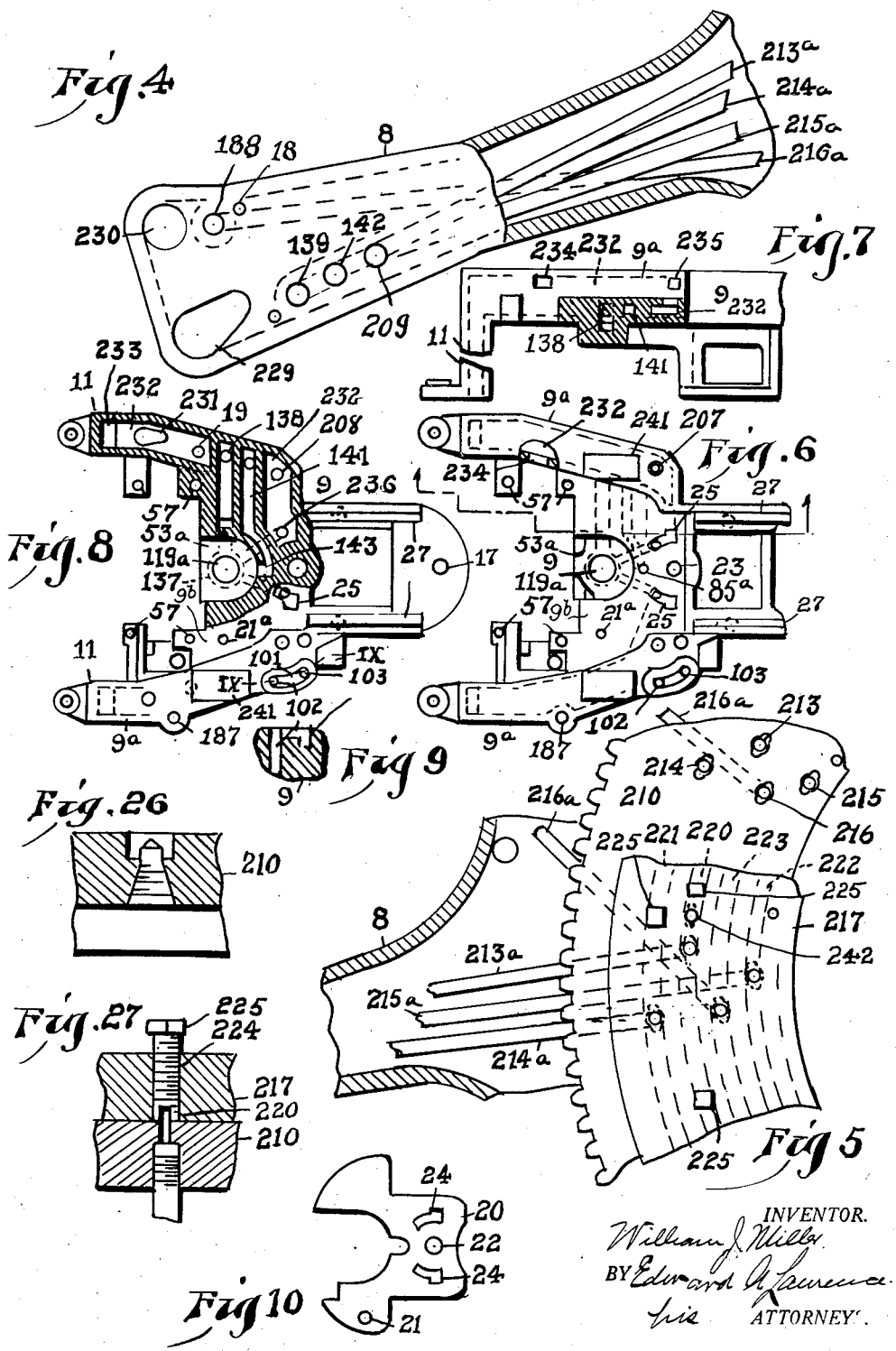

Dec. 8, 1931.  W. J. MILLER  1,835,172
GLASS FABRICATING MACHINE
Original Filed Oct. 16, 1925  9 Sheets-Sheet 5
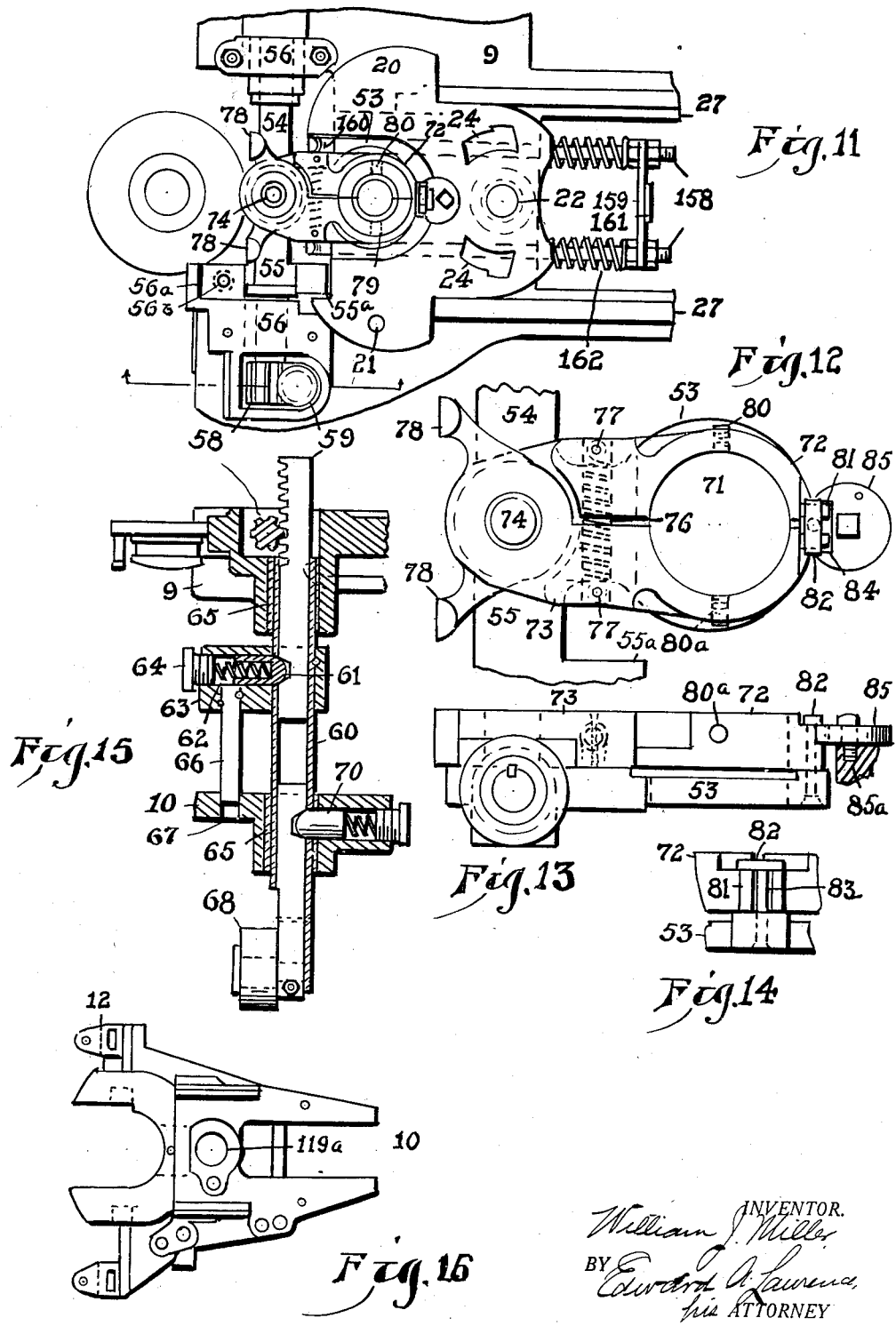

Dec. 8, 1931.  W. J. MILLER  1,835,172
GLASS FABRICATING MACHINE
Original Filed Oct. 16, 1925    9 Sheets-Sheet 6
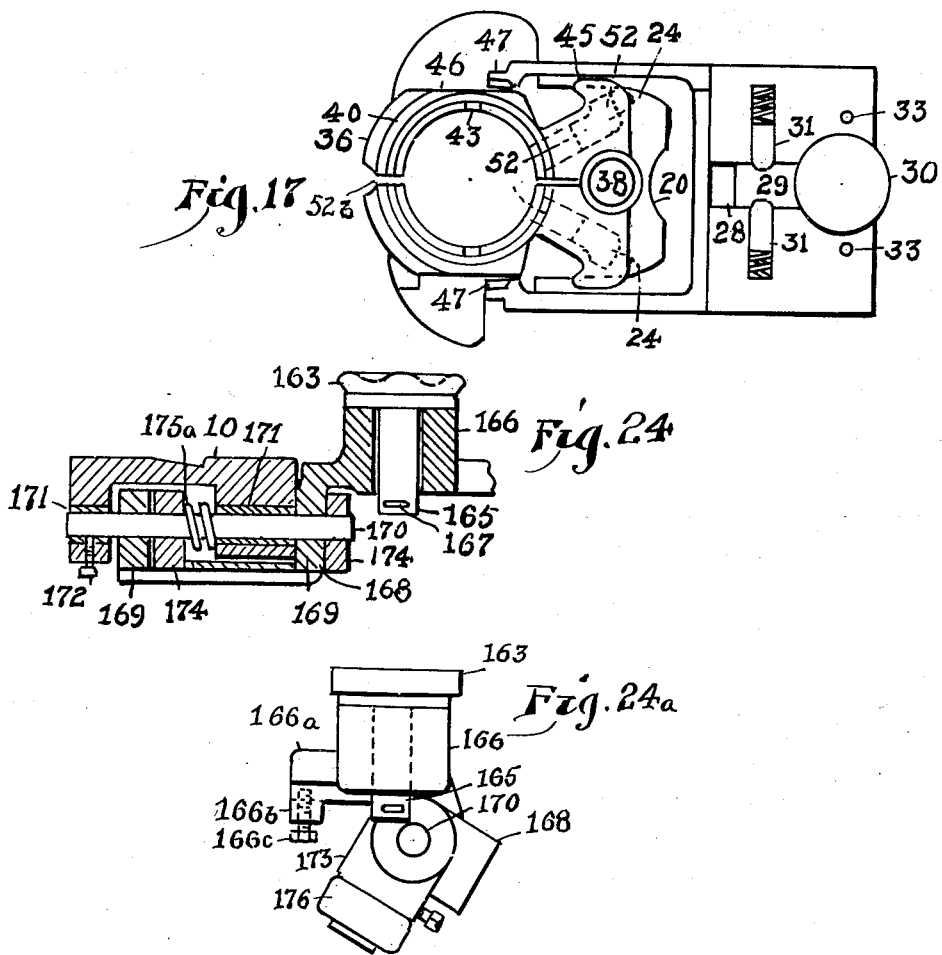

Dec. 8, 1931.  W. J. MILLER  1,835,172
GLASS FABRICATING MACHINE
Original Filed Oct. 16, 1925   9 Sheets-Sheet 7
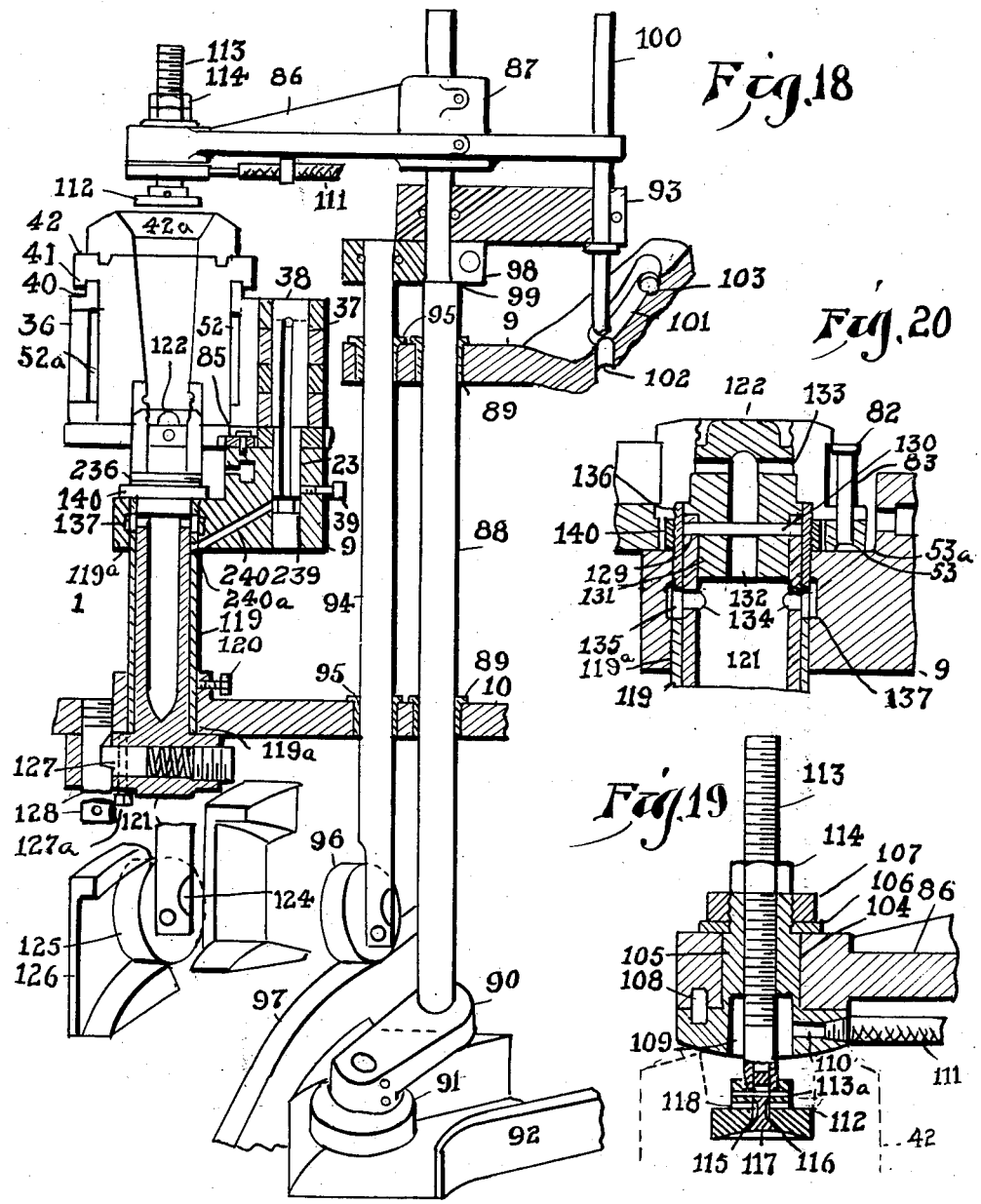

Dec. 8, 1931.  W. J. MILLER  1,835,172
GLASS FABRICATING MACHINE
Original Filed Oct. 16, 1925   9 Sheets-Sheet 8
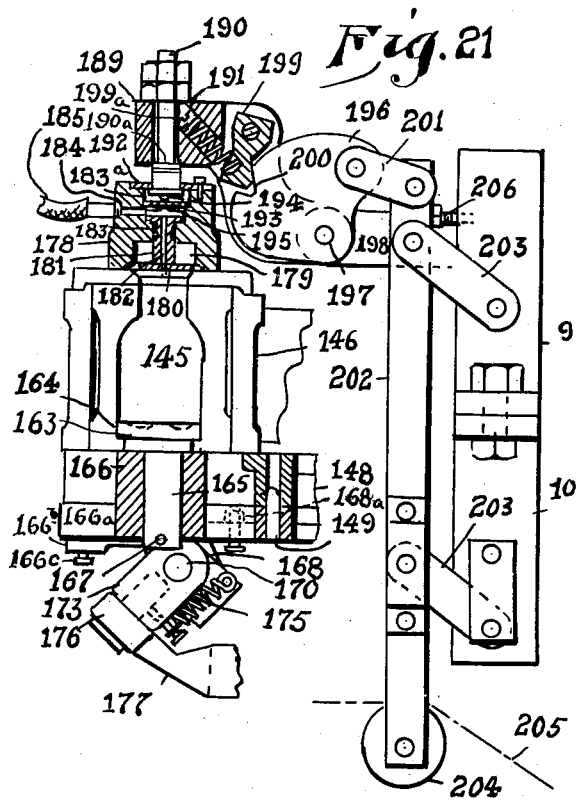
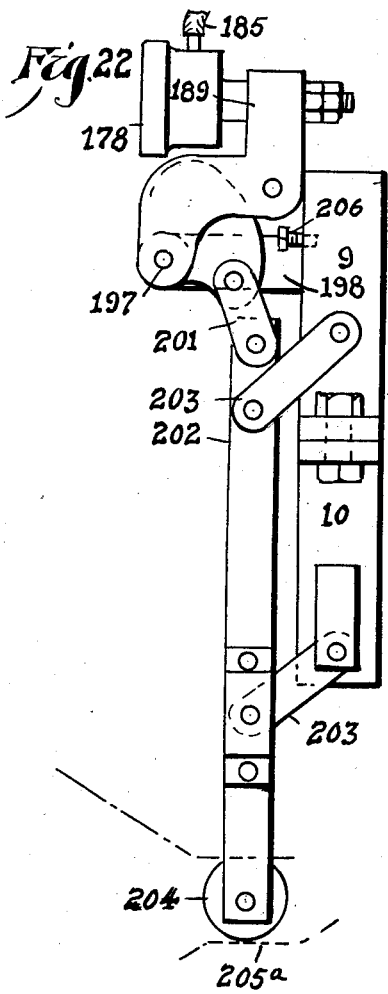
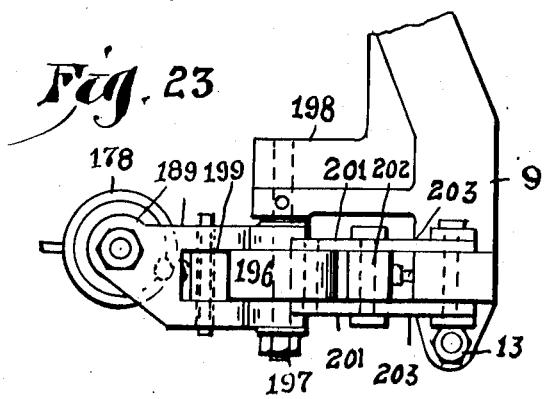
INVENTOR.
William J. Miller
BY Edward A. Lawrence
his ATTORNEY Dec. 8, 1931.  W. J. MILLER  1,835,172
GLASS FABRICATING MACHINE
Original Filed Oct. 16, 1925  9 Sheets-Sheet 9

INVENTOR.
William J. Miller
BY Edward A. Lawrence
his ATTORNEY.

Patented Dec. 8, 1931

1,835,172

UNITED STATES PATENT OFFICE

WILLIAM J. MILLER, OF SWISSVALE, PENNSYLVANIA, ASSIGNOR TO HAZEL-ATLAS GLASS CO., OF WHEELING, WEST VIRGINIA, A CORPORATION OF WEST VIRGINIA

GLASS FABRICATING MACHINE

Application filed October 16, 1925, Serial No. 62,808. Renewed February 24, 1931.

One of the characteristic features of my invention is the provision of a rotary mold support upon which are mounted a plurality of units, each comprised of a parison mold, a finishing mold, and associated mechanism whereby a mold charge is deposited in the parison mold, the parison is then formed in said parison mold, the parison is then transferred from the parison mold to the finishing mold, the parison is then blown to form in the finishing mold, and is then discharged therefrom.

The units are assembled prior to their installation on the mold support, and may be removed therefrom without disassemblage.

The mold support is of substantially star-shape having a central hub which rotates with the main column of the machine, as an axis, and from which radiate a plurality of arms between which the units are mounted.

Means are provided whereby the units may be lowered into place on said arms, the arms and units having coacting means for properly centering and holding the units in place. The units may be individually removed by simply raising them from place.

The radial arms are hollow and air under pressure is admitted thereto, means being provided for discharging such air into contact with portions of the mechanism liable to become overheated. Means are provided for regulating the intensity of the cooling drafts.

The pipes or conduits for supplying air under pressure for the various fabricating operations are led through said arms and the admission of air to said pipes is controlled by a valve mechanism operated by the rotation of the support upon which the units are carried. Vacuum is also furnished by pipes leading through said arms, said vacuum being controlled by the same or similar valve mechanism.

The several mechanisms and devices which comprise the individual units are mounted on a frame comprised of an upper and lower frame member which are attached together, and when the unit is in place on the machine, the top frame member rests on the tops of adjacent arms while the lower frame member depends between said arms.

The parison mold and the neck ring-transfer are mounted on the upper frame member while the finishing mold is mounted on the lower frame member.

I show new and improved means for closing the upper end of the parison mold for the parison blowing operation.

I also show new and improved means for forming the neck of the parison and blowing the mold charge into parison form.

I show a new and improved neck-ring for forming the neck of the parison, and also new and improved means for transferring the parison, after it has been formed from the mold charge to the finishing mold.

I show new and improved means for compacting the mold charge in the neck ring and the lower end of the parison mold, said means providing for suction applied to the lower end of the parison mold or for compressed air applied to the upper end of the parison mold, or both, applied either in sequence or simultaneously.

I provide new and improved means for removing broken glass or imperfectly formed articles or parisons from the parison molds and from the plunger and from the neck ring seat.

I provide new and improved means for cooling and lubricating the plunger.

I provide new and improved valve means for adjusting the length of time or period of application of fluid pressure or vacuum in the several operations or steps of the machine.

Other novel features of construction, and also of arrangement of parts will appear from the following description.

Figure 25:
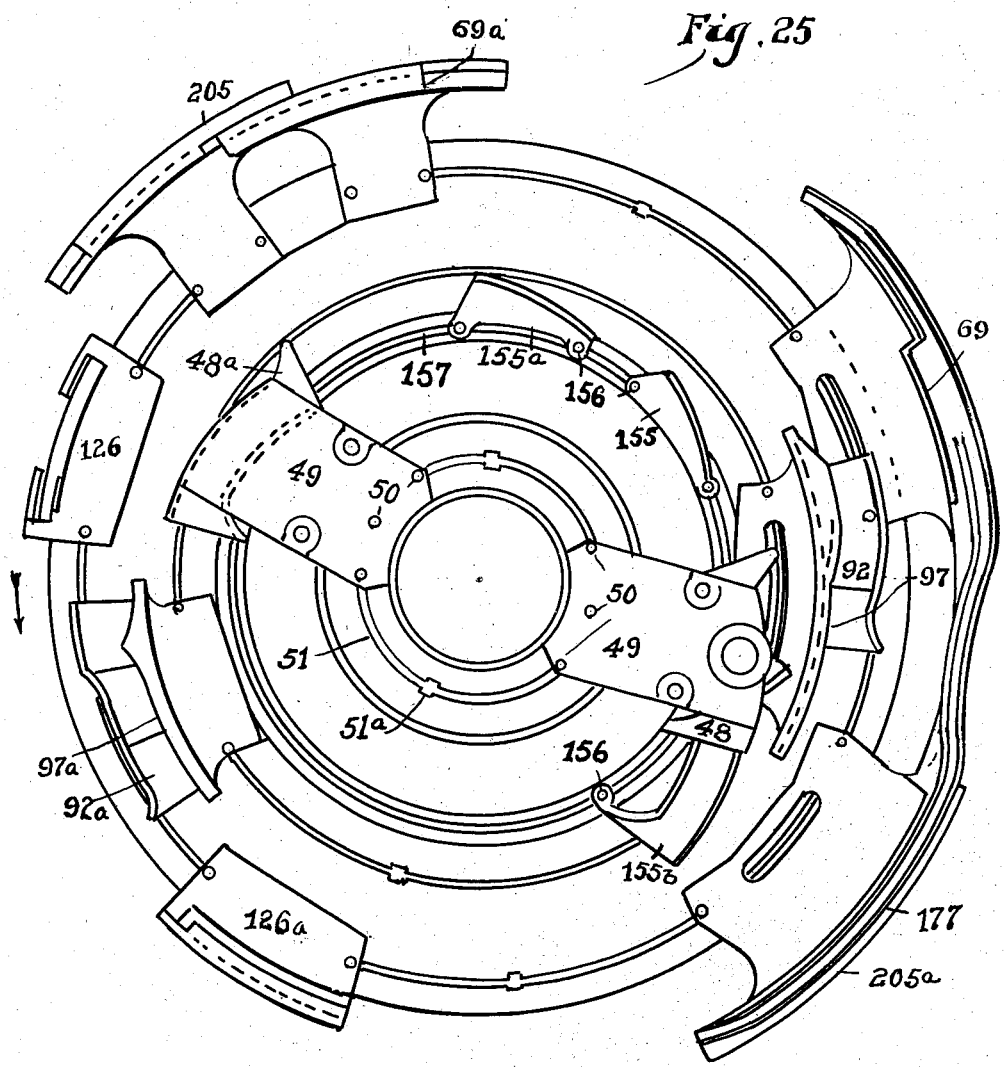

In the accompanying drawings, wherein I have illustrated the best embodiment of the principles of my invention now known to me, Fig. 1 is a side elevation of one of the units of my improved machine, the carrying arm in front thereof being broken away to better show the unit; Fig. 2 is a vertical section of the same taken along a plan radial of the axis of rotation of the machine; Fig. 2a is a detail partially in horizontal section showing the mounting of a parison-mold half in its hinge member; Fig. 3 is a plan view of the unit, the adjacent portions of the machine being shown in dotted lines; Figs. 4 and 5 together form a plan view, partially broken away in horizontal section, of one of the radially disposed supporting arms; Fig. 6 is a plan view of one of the upper frames; Fig. 7 is a side view of the same, partially broken away in vertical section; Fig 8 is a plan view of the same partially broken away in horizontal section; Fig. 9 is a sectional detail taken along the line IX—IX in Fig. 8; Fig. 10 is a plan view of one of the parison mold-plates; Fig. 11 is a broken plan view of one of the upper frames with the neck ring and transfer; Fig. 12 is an enlarged plan view of the transfer with the neck ring removed; Fig. 13 is a side view of the same; Fig. 14 is a detail thereof looking from the right in Fig. 13; Fig. 15 is an enlarged detail in vertical section of one of the transfer-operating mechanisms; Fig. 16 is a plan view of one of the lower frames; Fig. 17 is a plan view showing a parison mold and its holder; Fig. 18 is an enlarged detail partially in elevation and partially in vertical section showing a parison mold, the top mold closure and its operating mechanism and the parison fabricating plunger; Fig. 19 is an enlarged detail in section of the parison mold closure and its mounting; Fig. 20 is an enlarged detail in section showing the parison fabricating plunger; Fig. 21 is a front elevation, partially broken away in section, showing a finishing mold and the blow head; Fig. 22 is a similar view of the blow head and its operative mechanism, the former being shown retracted; Fig. 23 is a plan view of the blow head mechanism; Fig. 24 is an enlarged section showing the finishing mold bottom and its mounting; Fig. 24a is a side elevation of the mold bottom structure; Fig. 25 is a diagrammatic view of the cam layout; Fig. 26 is an enlarged sectional detail of the valve ring, and Fig. 27 is an enlarged sectional detail of the valve plate and ring.

Referring to the accompanying drawings, the base of the machine is characterized by the circular platform 1, which may be rendered portable by the provision of the usual axles and wheels.

The axial support for the rotary elements of the machine is in the form of central, cylindrical column 2. 3 is an elevated annular platform surrounding the column provided with the raceway 4 for the balls or other anti-friction members 5 which support from below the hub 6 which rotates about the column 2 as its axis, by any suitable means. The hub 6 is hollow having an annular chamber 7. 8 represents a plurality of hollow arms which extend radially from the hub 6 and have their interiors connected with the interior of said hub.

The arms are equal in number to the number of mold sets which the machine is to carry, each of said sets being composed of a parison mold and a blow mold.

The carriage comprised of the hub 6 and the arms 8 is assumed in the present embodiment to rotate continuously and counterclockwise.

Each set of molds is carried by a unitary structure, comprised of an upper frame 9 and a lower frame 10 which are connected together and removably mounted, with their associated parts, as a unit on the machine.

The lower frame 10 is secured to the under side of the upper frame 9.

Thus at either side at its front or outer end the frame 9 is provided with depending legs 11 whose extremities are extended horizontally and pierced for bolts while the frame 10 is provided with corresponding but upwardly extending legs 12 whose horizontal extremities mate with the extremities of the legs 11 and are rigidly attached thereto by the bolts 13. At either side, near its inner or rear end the frame 9 is provided with depending open brackets 14 which extend down between the adjacent arms 8, when the machine is assembled, and whose flat under surfaces mate with flat portions of the frame 10, registering holes being provided for the clamping bolts 15 which attach the rear portions of the frames rigidly together.

When in position in the machine the rear end of the frame 9 rests on top of the hub 6, and a dowel 16 fixed to said hub extends upwardly into a hole 17 drilled in the plate 9. The sides of the frame 9 also overlap the top surfaces of the adjacent arms 8 and said arms are provided with upwardly extending dowels 18 which are inserted in holes 19 drilled in the bottom wall of said frame. The sides and forwardly extending portions 9a of the frame 9 are of higher elevation than the central portion 9b of said frame, as shown in Figs. 6, 7 and 8.

20 is a mold plate which is mounted on the frame 9 and is provided with a hole 21 which is engaged by a dowel 21a extending upward from the frame 9. Plate 20 is provided with a vertically disposed and circular hole 22 for the mold hinge pintle which registers with a similar hole 23 in the frame 9, and the central front of said plate is cut away to provide clearance for the neck ring and holder.

The plate 20 is also vertically apertured as at 24 to permit blasts of compressed air to escape from the ports 25 in the top of frame 9, which ports communicate with the chambered interior thereof.

26 is the slidable yoke member by means of which the parison mold is opened and closed.

The inner or stem end of said yoke 26 slides between the guide flanges 27 of the frame 9, while its front or yoke end extends forwardly on either side of the parison mold position. The stem of said yoke 26 is provided on its upper surface with a longitudinally disposed trough 28 in which is mounted a block 29 carrying the roller 30 rotatable on a vertical axis. The block is normally held fixed in relation to the stem by means of the spring dogs 31 mounted in seats in said stem and engaging notches in the sides of said block.

The roller is engaged by cam-means later to be described, thus sliding the yoke 26 radially of the machine. In case said yoke abnormally resists movement, the spring dogs will become disengaged from the block 29 and the latter will move with the roller, in response to the cam, while the yoke remains idle, thus avoiding breakage. 32 is a cover plate which may be attached to the upper face of the stem to prevent the block and dogs from jumping from their seats, the cover being secured by screws driven into holes 33 in the stem and being also provided with a longitudinally disposed slot 34 to give clearance for the stem of the roller when the block moves independently of the yoke member.

The arms of the yoke member 26 are extended to a greater height than the stem of the latter and an arcuate flange 35 of equal elevation connects the base of said arms, as shown in Fig. 2.

36 represents the two hinge members upon which the parison-mold parts are mounted. Said hinge members have interlacing hinge-sleeves 37 which are engaged by the pintle 38 which has its lower end engaged in the registering holes 22 and 23 of the plate 20 and frame 9, being held stationary, as by the set screw 39. The lower end of the pintle which is inserted in the holes 22 and 23 is eccentric to the upper end, as shown in Fig. 2, so by turning the pintle in its mounting it may be adapted for longer or shorter hinge members.

The free ends of the hinge members 36 are substantially semi-circular in form, and tops thereof are cut away exteriorly to form a shoulder 40 over which the perimetral depending hook flanges 41 of the mold halves 42 fit down over, to mount the mold halves on the hinge members. See Fig. 18. The inner wall of each hinge member is also provided with a vertical notch 43 which is engaged by a vertical rib 44 on the mold half, thus preventing the mold half from rotating out of its proper position in the hinge member. See Fig. 2a.

The hinge members are provided with shoulders 45 and plane surfaces 46 which are engaged by wear plates 47 bolted to the inner faces of the arms of the yoke member employed respectively to open the mold when the yoke moves inwardly toward the axis of the machine and to close the mold and lock the mold closed as the yoke moves outwardly.

The rollers 30 of the parison-mold yokes are engaged in turn by the inverted cam tracks 48 and 48a which are carried by brackets 49 extending from the top of the column 2, the said brackets being adjustably held in position by means of bolts 50 whose heads are engaged in under cut slots 51 in the top of the column so that the bolts may be slid along said slots to properly position the cam tracks to open and close the parison-molds at the proper moments. By tightening the nuts on the bolts the brackets are clamped rigidly in place. Said slot is provided with enlargements 51a to permit the insertion of the bolts. When the roller 30 is engaged by the track 48, the parison mold is opened, and said mold is closed when the roller is engaged by the track 48a.

The hinge members 36 are interiorly chambered, as at 52, said chambers being open through the bottom of the members so as always to be in registry with the apertures 24 in the mold plate 20 to receive cooling air from the chambered interior of the frame 9. The chambers 52 are apertured through the mold receiving portion of the hinge members so as to discharge blasts of air between the molds and the hinge members, space 52a being provided between the same to receive the air, as is shown in Fig. 18. As shown in Fig. 17, there is a slight gap, 52b, between the free ends of the hinge members 36. When the parison mold is closed, this providing for the escape of the air passing from the chamber 52 and maintaining currents of air.

53 is the transfer carrier plate for the neck ring. At one end it is provided with oppositely extending trunnions 54 and 55 which are journaled in sleeve bearings 56 mounted on the ends of the frame 9 by bolts extending through the vertical holes 57 in portions of frame 9. The trunnion 55 is extended beyond its bearing and is provided with a pinion 58 which is in mesh with a vertically disposed rack-bar 59. 58a is a cover cast on the sleeve bearing to enclose the pinion and rack.

The lower portion of the bar 59 is cylindrical and fits in a vertically disposed sleeve 60 and is held fixed thereto by means of a spring dog 61 mounted in a seat 62 in a block 63 through which said sleeve extends and to which said sleeve is pinned or otherwise fixed, said dog extending through an aperture in said sleeve and engaging a notch in said bar. Thus the bar will reciprocate vertically with the sleeve unless the transfer abnormally resists operation, whereupon the dog will be released from the notch and the sleeve will move while the rack-bar remains idle. The compression of the spring of the dog may be adjusted by means of the screw cap 64. Thus when the transfer mechanism abnormally resists rotary movement in either direction, the dog 61 will be disengaged from the notch in the bar 59, thus avoiding breakage of parts.

The sleeve moves longitudinally in bearings 65 in the frames 9 and 10, said bearings being provided with bronze metal bushings to reduce friction. The sleeve and rack are prevented from turning by means of a pin 66 depending from the block 63 and working in a hole 67 in the frame 10.

The lower end of the sleeve 60 is provided with a roller 68, which is mounted on a horizontal axis and adapted to be engaged by the channel cam tracks 69 and 69a carried by the base platform 1, so that the transfer is swung back and forth on its horizontal axis between the parison-mold and the blow-mold at the proper times, the cam track 69 acting to shift the transfer to the blow or finishing mold while the cam track 69a acts to return the transfer to position under the parison mold.

A spring dog 70 mounted in a socket in the frame 10 intersects the bearing 65 and engages a notch in the sleeve 60 when the latter attains its up position, thus sustaining the weight of the sleeve and rack bar so that they will not exert a downward pull on the gear while at rest.

The free end of the carrier plate 53 is provided with a circular opening 71 to provide clearness for the parison plunger later to be described.

72 represents the neck ring holders which move on the plate 53 and are integral with the hinge arms 73 which fit one on top of the other and are pivotally secured to the plate 53 by means of the pintle bolt 74 which extends through the registering holes in the hinge arms and has a reduced portion which extends into a hole in the carrier plate 53, a nut 75 being screwed up on the bolt against said plate.

When the neck ring and holder are in position under the parison mold, they occupy a depressed seat 53a in the frame 9 so that the parison mold halves, which slide on the plate 20, may be closed over the neck ring.

The neck ring halves are resiliently held and drawn together by means of a helical spring 76 whose ends are secured to pins 77 on said arms, and which occupies trough-like recesses in the faces of said arms. The hinges are provided with rearwardly extending toes 78, the said toes being opposed to the corresponding hinge members, as shown in Fig. 12, and depend downwardly when the neck ring is positioned above the blow mold for the finishing blow.

The semi-annular neck ring halves 79 have the proper interior contour, so that when matched together they form the necessary mold to produce the desired character of neck. Said halves fit in the semi-circular holders 72 and are held in place therein by any convenient means, such as the cap screws 80 which extend through holes 80a in the holders and are screwed into threaded holes in the neck ring halves.

To prevent sagging of the neck ring holders and neck ring halves when they are inverted above the blow mold, and to hold them horizontal and snug against the plate 53, I provide the holders with lips or projections 81 on their free ends which, when the holders are closed together are engaged by a block 82 attached by a bolt 83 to the plate 53. Thus the neck ring halves are kept in proper alinement and snugly against the carrier plate 53. When the transfer is swung into position beneath the parison mold, the projecting ends of the lips 81 fit down into a seat 84 in a pillow block 85 floatingly secured in place on the mold plate 20 by means of a bolt screwed into the threaded hole 85a in said plate. Thus the neck ring cannot separate during the parison forming operation.

One of the trunnions 55 is provided with a radially extending lug 55a which, when the neck ring is in position above the blow mold, occupies a recess 56a in the bearing member 56, as shown in Fig. 11. An adjustment bolt 56b is screwed up through the floor of the seat and contacts with the lug 55a and thus provides means for regulating the position of the neck mold to properly accommodate it to the blow mold.

If desired the neck ring may be arranged to remain in position over the blow mold during the finishing blowing operation, the parison remaining supported by the neck ring.

A closure is provided for the upper end of each parison mold during the parison forming operation. The structure shown for this purpose is as follows.

86 is a horizontally disposed plate provided with a vertical split socket 87 by means of which the plate is clamped on the upper end of a rod 88, which rod extends down through the sleeve bearings 89 in the frames 9 and 10, and has its lower end provided with a crank-arm 90 provided at its outer end with a depending roller 91 mounted on a vertical axis. The roller 91 engages the trough-shaped cam tracks 92 and 92a carried by the platform 1, and thus the rod 88 is rotated swinging the plate 86 on a vertical axis.

93 is a block keyed to the rod 88 and extending radially therefrom. 94 is a second vertically disposed rod journaled in sleeve bearings 95 in the frames 9 and 10, and having its lower end provided with a roller 96 mounted on a horizontal axis. The roller engages cam tracks 97 and 97a on the platform 1 by means of which the rod 94 is raised and lowered at the proper times. The upper end of the rod 94 is provided with a keyed-on cross-head 98 which is provided with a hole through which the rod 88 loosely extends, so that said rod 88 may freely rotate relative to the cross-head 98. The cross-head 98 is interposed between the block 93 and a circumferential shoulder 99 on the rod 88, so that the rods 88 and 94 are raised and dropped in unison. 100 is a vertically disposed rod clamped in a split socket in the end of the block 93, and extending up through a hole in the plate 86. The lower end of said rod 100 engages an arcuate groove 101 in the frame 9 which is concentric with the axis of rotation of the rod 88, and when the mold closure is in closing position above the parison-mold, the end of the rod 100 drops into a hole 102 at one end of said groove, thus holding the cover against lateral displacement and allowing the cover to rest on the mold. When the plate 86 is raised and swung to one side, as will be later explained, the lower end of the rod 100 drops into a socket 103 at the other end of said groove, thereby locking the cover in its inoperative position.

The plate 86 is provided with a vertically disposed circular hole 104, and 105 is a bushing whose neck is inserted up through the hole 104 and which is held in place therein by means of the washer 106 and the nut 107 which is screwed down on the threaded neck of the bushing. The bushing is held against rotation out of its proper positon by means of a dowel 108 which engages registering holes in the head of the bushing and in the plate 86.

The lower end of the bushing is enlarged to form a head which bears upwardly against the lower surface of the plate 86. The bore of the bushing is enlarged at its lower end to form a chamber 109. A port 110 leads radially through the head of the bushing into the chamber 109 and has its outer end connected to a compressed air pipe 111 which is formed of flexible hose.

The bottom surface of the bushing 105 engages the open top of the parison mold, when lowered, as indicated in dotted lines in Fig. 19, and said surface of the bushing is preferably somewhat convexed, as shown, so as to provide a limited but sealing contact with the mold, thus preventing a material escape of compressed air from the mold. The bushing, by its contact with the mold, also serves to limit the extent of insertion of the plug 112 into the mold.

112 is a plug whose head closes the upper end of the parison mold, preferably fitting down into the mold cavity. The plugs are interchangeable so as to fit the particular mold in use at the time. Said plug is preferably concaved at its lower face, so as to give a rounded upper end to the parison when the same is fabricated from below in the parison-mold.

The neck of the plug is provided with a threaded bore into which is screwed the extremity of a screw rod 113, which rod is screwed up through the threaded bore of the bushing 105. 113a is a pin which prevents the plug turning on the rod. A lock nut 114 is screwed down on the rod 113 against the upper end of the bushing. By adjusting the rod 113 in the threaded bore of the bushing, the elevation of the plug relative to the plate 86 may be regulated, thus adapting the plug to different heights of parison-molds and regulating the degree to which the plug is inserted into the mold.

The plug 112 is provided with an interior bore 115 which is connected to the lower face of the plug by the valve seat 116 which tapers upwardly. 117 is a drop valve adapted when raised to close said seat 116 and having its stem extending upwardly through said bore 115 and longitudinally slotted to receive the pin 113a by means of which the valve is prevented from dropping out. The lower end of the screw rod 113 is axially cored to provide clearance for the valve stem. The stem of valve 117 is reduced circumferentially within the bore 115 to provide an annular air passage. 118 represents radial passages in the plug which connect the bore 115 to atmosphere.

When the gob or mold charge has been dropped down into the lower end of the parison mold, the plate 86 is swung, clockwise in Fig. 3, above said mold so that the plug 112 is vertically alined with the upper end of the mold, and the plate is then dropped, the lower end of the pin 100 dropping into the hole 102 in the plate 9, and the plug 112 entering the mold to the predetermined degree regulated by the adjustment of the screw rod 113 in the threaded bore of the bushing 105, the bushing resting upon and sealing the upper end of the parison mold.

When the bushing has come to rest in sealing engagement with the upper end of the mold, compressed air is admitted through the pipe 111 into the chamber 109 and thence escapes into the upper portion of the parison mold above the plug 112. The compressed air passes thence through the ports 118 into the bore 115 and past the valve 117 into the mold cavity below the plug. Thus compressed air is admitted into the parison mold to compact the molten glass in the lower end of the parison mold and "fill" the neck ring to properly form the neck. After the parison has been completely fabricated in the parison mold, the plug is raised and swung, counterclockwise in Fig. 3, into its inoperative position, the lower end of the rod 100 being stepped in the socket 103.

By adjusting the position of the carrier plate 86 on the rod 88, by means of its split socket 87, the mold closure may be adjusted to accommodate itself to different heights of parison molds.

I also, as will later appear, provide means for compacting the mold charge and filling the neck ring by means of suction applied to the lower end of the parison mold, and thus may, if preferred, omit the compressed air connections of the plug, or both suction applied from below and compressed air applied above the mold charge may be employed.

119 is a vertically disposed cylindrical sleeve fixed in alined holes 119a in the frames 9 and 10 and rigidly held in place as by the set screw or screws 120. This sleeve also forms the pintle for the blow-mold hinges, as will be later explained.

121 is a rod which is longitudinally reciprocable in the sleeve 119 and has mounted on its upper end the parison pressing bit 122. The lower protruding end of said rod 121 is flattened and provided with a horizontal hole 123 and is split vertically and provided with a clamping bolt so as to clamp the horizontal pin 124 in the lower end of the rod. The pin 124 has rotatably mounted thereon the roller 125 which is engaged by the vertically arcuate channel tracks 126 and 126a carried by the platform 1, so as to alternately raise and lower the rod 121 at the proper intervals.

127 is a horizontally disposed spring dog carried by the rod 121 and adapted to engage a notch in a bolt 128, depending from the frame 10, when the rod 121 is in its uppermost position. The bolt 128 is adjustable vertically relative to the frame 10 so as to regulate the position in which the raised rod is locked. By this means the rod and bit are prevented from dropping by gravity, requiring the depresssion of the roller by the proper channel track to lower the rod and bit.

The upper portion of the rod 121 is cored out from its upper end, and adjacent to its upper end, its walls are provided with diametrically alined holes 129 to receive a pin 130 which extends through a diametric hole in the reduced neck 131 of the bit 122, thus detachably connecting the bit to the rod. The protruding upper end of the bit 122 is of proper contour to enter into and cooperate with the neck ring to form the neck of the parison when the bit is moved upwardly into the neck ring, as shown in Figs. 18 and 20.

The neck 131 of the bit 122 is provided with an upwardly extending axial bore 132 whose upper end connects with the radial ports 133. Below the bit the perimetral walls of the rod 121 are provided with the radial ports 134 which, in both positions of the plunger, register with the annular space 135 between the upper end of the sleeve 119 and the lower end of a sleeve 136 which is interposed between the plunger and the opening 119a in the frame 9, above the upper end of the sleeve 119. 137 is an annular groove in the wall of the opening 119a in the frame 9, which groove registers with the annular space 135 and communicates with a horizontal passage 138 in said frame. The outer end of the passage 138 opens through the bottom wall of the frame and registers with a port 139 in the top wall of the arm 8.

When the mold charge has been deposited in the upper end of the parison mold and compacted therein, the neck is formed by the compacting of the glass between the neck ring and the raised bit. The bit is then dropped and air is admitted through the passage 138, thus blowing the parison upwardly against the plug 112 which has previously been inserted into the mold to form the cavity in the parison, the plug limiting the length of the parison. The upward expansion of the glass closes the valve 117. The dog 127 prevents the bit being prematurely depressed. The bevelled lower face of the dog and the bevelled mating surface of its notch insures the snug matching of the plunger bit and the neck ring, the bevelled engagement resiliently forcing the plunger bit upwardly, thus compensating for variations in plunger length and other irregularities.

The sleeve 136 acts as a guide to the ascending bit and fits up into the countersunk lower ends of the neck ring parts. To enable it to be adjustable vertically, it is exteriorly threaded to receive an interiorly threaded collar 140 which rests upon the frame 9 and may be screwed up or down to lower or raise the sleeve 136.

The uppermost position of the plunger may be regulated by means of an adjustment bolt 127a screwed up through a threaded hole in the housing of the spring dog 127 and adapted to strike against the lower surface of an adjacent portion of frame 10 as the plunger is moved upwardly.

141 is a horizontal passage in the frame 9 having its one end in communication with the port 142 in the top wall of the arm 8, while its inner end is connected by the port 143 with the seat 53a, so that a blast of compressed air may be admitted to said seat after the parison-mold has opened and the neck ring swung away, to clean off any particles of glass which may remain in said seat and which might interfere with the return of the neck ring. Or the puff may be applied while the neck ring is in position.

145 represents the two halves which form the partible blow or finishing mold in which the parison is fabricated into final form.

Said mold parts 145 are each mounted in a hinge member 146 in a manner similar to the mounting of the parison mold parts already described. The hinge members 146 are provided with the usual interlaced pintle sockets 147 through which the sleeve 119 extends as a pivot member or pintle. The hinge members slide on a blow mold plate 148 which is provided with a sleeve socket 148a through which the sleeve 119 passes. A dowel pin 149 engages registering holes in the frame 10 and plate 148 to prevent the latter shifting.

150 is a yoke member for opening and closing the blow mold, slidably mounted on the frame 10 and having its inner end provided with a roller pin 152 on the lower end of which is rotatably mounted the roller 153 which is engaged by the cam tracks 155, supported from the platform 3, thus providing for the proper reciprocation of the yokes 150. The brackets by which the cam tracks 155, 155a and 155b are supported are bolted to the platform 3 by means of bolts 156 whose heads are engaged by arcuate slots 157 in the platform, said slots being undercut to retain the bolts while permitting them when loosened to be shifted along the slots, thus providing for the proper adjustment of the cam tracks. The track 155 closes the blow molds, the parison is inserted before it closes and the neck ring comes to rest on top of the mold, the cam 155a then completes the locking of the mold. The cam 155b opens the mold.

The arms of the yoke 150 are provided at their ends with wear plates similar to those of the yoke of the parison mold, which, when the yokes move outwardly, contact with the plane surfaces of the hinge members to close the molds, and when the yokes move inwardly, contact with the shoulders on the hinge members to open the molds.

158 represents a pair of parallel rods whose inner ends are connected together by the rigidly attached cross head 159, and which extend outwardly through sleeve bearings cored in the frame 9. The outer ends of the rods 158 are bent upwardly, as at 160 so that they may engage the downturned toes 78 of the neck-ring hinge members when the neck ring is in position on the blow mold. 161 is a finger rigidly depending from the cross head 159 in the path of the upwardly extended extremity of the roller pin 152 so that as the yoke 150 is moved outwardly, to close the blow mold, the rods 158 will also be moved outwardly, engaging the toes 78 and forcing the neck ring parts open as the cam 155a completes the closing of the finishing mold, thus dropping the parison into the finishing mold either just as it closes or, as is preferable, after it closes.

As the neck ring is thus opened to drop the parison into the blow mold, the transfer starts its reverse movement, swinging the neck ring from over the blow mold to its position beneath the open parison mold, which then closes over the neck ring.

The neck ring is held open until it has been sufficiently elevated to clear the neck of the parison now contained within the blow mold. This advantageous lag in permitting the neck ring to reclose is the result of the continued forward or outward travel of the yoke 150 in completing the closing and locking closed of the blow mold, the toes 78 remaining engaged by the rods 158 until the transfer has swung far enough to clear such engagement.

Springs 162 coiled about the rods 158 between the cross head 159 and the adjacent edge of frame 9, shift the rods 158 inwardly toward the axis of the machine as the blow mold is next opened.

The blow mold plate 148 is apertured at its front to provide clearance for the movement of the mold bottom from its dropped to its raised position, and vice versa.

The mold bottom 163 is of proper form to suit the particular design of mold in use and to properly shape the bottom of the finished article. The mold parts 145 are grooved internally, as shown at 164 in Fig. 21, to receive the perimetral edge of the mold bottom, so that when the mold bottom is raised, the mold parts close about it and the bottom is thus held in position during the blowing operation.

The mold bottoms are interchangeable on their mountings, so that the proper bottoms may be installed with each type of mold employed at various times on the machine. Thus the mold bottom 163 is shown provided with a depending stem 165 which extends through a cylindrical opening in a cylindrical block 166 and is held loosely therein by a cotter pin 167.

The block 166 is integral with a bracket 168 having two spaced apart bearings 169 whose axis is at right angles to that of the block 166. The bracket 168 is pivotally supported on a horizontal axis by a shaft 170 extending through bearings 171 depending from the frame 10 and held fixed therein, as by the set screw or set screws 172. 173 is a second bracket likewise provided with a pair of alined bearings 174 spaced the same distance apart as the bearings 169 so as to interfit with the bearings 169 on the shaft 170 as shown in Fig. 24.

The brackets 168 and 173 are connected together by the helical spring 175. 175a represents a helical spring coiled about the shaft 170 and interposed between the adjacent bearings 171 and 174, thus maintaining the brackets 168 and 173 in resilient contact.

176 is a roller rotatably mounted on a pin depending from the bracket 173 into the path of a cam rail 177 extending up from the table 1. The resilient connection between said brackets is such that when the cam forces the roller outwardly away from the axis of the machine, the mold bottom is raised into its operative position, but the raising force is resiliently applied so that should glass or other impediment resist the elevation of the mold bottom, the same would yield without breakage. The mold bottom is held in its elevated position until the mold closes about it. After the blow mold has been opened, the roller passes beyond the cam, so that the weight of the parts causes the brackets to spring, thus automatically dropping the mold bottom and discharging the ware supported thereby.

The block 166 is provided with an integral arm 166a having a laterally disposed lip 166b which, when the bottom is in its raised position, extends under the adjacent portion of the frame 10. Said lip is provided with an adjustable abutment bolt 166c adapted to engage the frame 10 from beneath. Thus by properly adjusting the bolt, the raised position of the mold bottom may be nicely adjusted to compensate for irregularities &c.

168a represents a similar abutment bolt screwed down through a threaded hole in the frame 10 and adapted to be engaged by the bracket 168 as the mold bottom drops from its raised position. Thus by the adjustment of the bolt 168a the degree to which the mold bottom drops may be regulated to properly discharge the finished ware.

The length of the finished ware is determined by the degree of upward extension of the raised mold bottom within the blow mold, as the top of the blow mold is always at the same predetermined elevation.

178 represents the blow-head which fits in capped relation with the top of the closed blow mold for blowing the parison to final form. The lower bore of said head is enlarged to form a downwardly opening chamber 179 in which is suspended the closure plate 180 which fits the top of the mold cavity or on the projecting end of the parison neck. The plate 180 is attached to the lower end of a stem 181 which extends up through and is vertically slidable in the intermediate contracted bore 182 of the head, and the upper end of the stem has an enlarged head which works in the larger intermediate bore 183 of said head. The descent of the stem is limited by the annular shoulder formed by the upper end of the bore 182. The stem and closure plate are axially bored for the admission of the air to the mold. It is evident that there is sufficient looseness between the head and the closure 180 so that the closure will seat itself properly on the upper end of the parison. Compressed air is admitted to the upper bore 183 by means of a lateral port 184 to the outer end of which is connected a flexible hose 185 whose other end is connected to a rectangularly bent pipe 186 whose lower end is screwed into the threaded upper end of a vertical port 187 in the frame 9. The lower end of the port 187 is in register with a port 188 in the top wall of the arm 8.

The head 178 is suspended from an angular lever 189 by means of a bolt 190 depending through a loosely fitting hole 191 in said lever, the lower and headed end of said bolt extending into the upper bore 183a of the head, which bore is of greater diameter than the intermediate bore 183, and being held therein by means of the annular cover plate 192 which is held in place by cap screws. It is thus seen that the head 178 is loosely mounted so as to accommodate itself to the top of the parison when lowered into engagement therewith. 193 is a washer fitting in the bore 183a below the bolt, and the head of the bolt is provided with a depending axial stud 194 to provide for a rocking motion between the parts. The washer 193 has a depending axial boss 195 on its lower surface which is provided with cruciform grooves, so that in case the upper end of the stem 181 rises into contact with said washer the passage of compressed air to the bore of the stem will not be either interrupted nor impeded.

The lever 189 is bifurcated so as to straddle a rocking segmental member 196 and is pivotally mounted on a horizontal shaft 197 whose inner end is fixed in a hole 198 in the frame 9. The segment 196 is also pivoted on said shaft between the legs of the lever 189. Said lever and segment are caused to normally swing as a unit by means of a spring latch 199 carried by the lever and engaging a notch 200 in the segment, but should the blow head abnormally resist movement, the dog will become disengaged, permitting the segment to be moved while the head remains idle, thus avoiding breakage.

The spring latch provides resiliency between the blow head and its operative connection, so that it is spring-pressed into capping relation with the mold. The strength of the spring may be regulated by adjusting the plug nut 199a against which the upper or outer end of the spring bears.

The segment 196 is connected by the twin links 201 to the upper end of a parallel movement lever 202 which is attached to the frames 9 and 10 by the upper and lower parallel links 203. The lower end of the lever 202 is provided with a roller 204 rotating on a horizontal axis and engaging cam tracks 205 and 205a carried by the table 1, so as to alternately swing the blow head down into capping engagement with the blow mold and out of engagement therewith and out of the way of the transfer when the neck ring is being positioned by the blow mold. The position of the head when in its lowered position may be nicely regulated to fit on the blow mold by interposing the requisite number of washers or shims 190a between the shoulder on the bolt 190 and the face of the lever 189.

It will be noted that the links 201 and 203 are disposed toward each other in an upwardly converging angle and over dead center, so that when the bar 202 has attained its uppermost position and the blow head is resiliently pressed down on the mold, due to the fact that the spring dog 199 has been forced slightly out of engagement with the notch 200, the upward pressure exerted by the blow head tends to elevate the bar 202 still farther. The limit of the elevation of said bar is adjustably determined by the abutment screw 206 which is screwed into a threaded hole in an adjacent portion of the frame 10.

This over-center link action locks the blow head in its blowing position and permits the passage of the roller 204 out of engagement with its cam track 205.

To elevate the blow head out of its blowing position, the bar 202 must be pulled down, by the engagement of the roller with the cam track 205a, to invert the links from their over-center position, after which the weight of the bar will complete the movement.

The flexible pipe 111 of the parison mold closure is attached to the upper end of a metal pipe 207 which extends down through the alined ports 208 in the top and bottom walls of the frame 9 being screwed into the lower of said ports. When the frame is in position on the arm 8, the said lower port 208 registers with a port 209 in the top wall of one of the arms 8.

210 is an annular plate which slips down onto the upper end of the hub 6 and is supported by the circumferential shoulder 211 of said hub, and is fixed to said hub, so as to rotate therewith, as by the dowel 212 engaging registering holes in the rib and plate.

Opposite to each arm 8 the plate 210 is provided with a group of four ports, indicated by 213, 214, 215 and 216, the lower ends of said ports being circular and threaded while the upper ends of said ports are narrowed radially of the plate and elongated circumferentially thereof, as shown in Figs. 5 and 26.

A bent pipe 213a within the chambered hub and the interior of the arm connects the lower end of the port 213 with the port 139 for the supply of compressed air to the groove 137 in the opening 119a of the frame 9, thus providing for the blowing of the parison in the parison mold.

A bent pipe 214a likewise connects the port 214 with the port 142 in the top wall of the arm 8, thus providing the compressed air for the puff admitted through the port 143 to the seat 53a of the frame 9.

A bent pipe 215a likewise connects the port 215 with port 209 in the top wall of the arm 8, thus providing compressed air for the parison mold closure for blowing down or compacting the mold charge in the neck ring and the lower portion of the parison mold.

The port 188 in the top wall of each arm 8 is connected by a pipe 216a, within the arm and the hub 6 with the port 216 of the group of ports opposite the next arm 8 in advance in the direction of rotation of the hub and arms, which in this case is assumed to be counterclockwise in Fig. 5.

217 is the stationary valve ring which is mounted on the top of the column 2 being secured thereto, as by bolts 218 whose heads fit in an annular undercut slot 219 in the top of the column, said slot being concentric with the column. By loosening the bolts the ring may be adjusted rotatively relative to the column, and the bolts may then be tightened to fix the ring in its adjusted position.

The under surface of the valve ring 217 is finished smooth so as to mate in flat surface contact with the similarly finished top surface of the plate 210, and to maintain resilient contact between the mating surfaces of the two elements, the bolts 218 are provided with helical springs 218a which press downwardly on the ring 217.

The under face of the ring 217 is provided with annular grooves 220, 221, 222 and 223, equal in number with the ports 213, 214, 215 and 216 in each group.

All the ports 213 are at equal radial distance from the axis of the plate 210. Likewise all the ports 214 are at an equal distance from the axis of said plate. Likewise all the ports 215 are at an equal radial distance from said axis. The ports 216 are all also at an equal radial distance from said axis.

The groove 220 registers with the ports 213; the groove 221 registers with the ports 214; the groove 222 registers with the ports 215; and the groove 223 registers with the ports 216.

The grooves 220, 221, 222 and 223 are connected by ports extending up through the ring 217 with individual compressed air supply pipes 220a, 221a, 222a and 223a provided with valves.

The grooves 220, 221, 222 and 223 are intersected from above at intervals by threaded holes 224 in which are screwed the valve-plugs 225 having their lower ends, which are positioned in the grooves, diametrically slotted. Thus by turning the valve plugs into proper position, a portion of the groove may be shut off from the supply of compressed air or the amount of air admitted to that portion of the groove may be regulated.

It is evident that at the proper instant and in the proper sequence, compressed air may be admitted to the various mechanisms employing the same, as has been already described. By adjusting the valves on the pipes 220a, 221a, 222a and 223a, the proper pressure may be obtained. The duration of the application may be adjusted by means of the valve-plugs 225.

The inner wall of the hub 6 is provided with an annular series of ports 226 which intermittently mate with annular ports 227 in the wall of the column 2, and compressed air is admitted from any convenient source into the interior of said column, which air escapes through the ports 227 and 226 into the chamber 7 of the hub 6 and thence into the chambered interior of the arms 8. Slidable gates 228 may be provided for the ports 227, thus controlling the admission of the air to the arms 8. Near their outer ends the arms 8 have apertures 229 and 230 in their top walls which apertures are overlapped by the upper frames 9. The bottom walls of said frames are provided with apertures 231 which mate with the apertures 229 and 230, thus admitting the compressed air into the interior chambers 232 of the upper frames 9.

The depending legs 11 of the upper frames 9 are hollow as indicated in dotted lines in Fig. 1, forming internal passages 233 connected with the internal chambers 232 of the frame 9. The upwardly extending legs 12 of the lower frames 10 are also hollow, as indicated by dotted lines and the internal passages 233a thus formed, communicate at their upper ends with the interior of the legs 11. Thus the legs 11 and 12 may be kept at the desired low temperatures. The chambers 232 are extended above the transverse passages 138 and 140 in the frame 9 and their inner ends turned inwardly toward the pintle hole 23. The ports 25 in the top wall of the frame 9 connect the chambers 232 to the ports 24 in the mold plate 20. Thus compressed air is admitted into the interior chambers 52 of the parison mold-hinge members when the parison mold is opened, thus cooling the parison mold parts by means of puffs of compressed air into the spaces 52a between the mold parts and their holders.

The ports 226 and also the ports 227 are wider than the intervening partitions or ribs of metal, so that, except when the gates 228 are closed or partially closed, there is a continuous flow of the cooling currents of air into the chamber 7 of the hub 6.

234 represents open ports in the inner side walls of the passages 232 for the discharge of a cooling draft of air on the transfer mechanism. Similar ports 235 provide for the similar discharge of a draft onto the hinge-connection of the parison mold.

236 represents passages in the frame 9 leading from the chamber 232 to the sleeve 119 which acts as the hinge-pintle of the finishing mold, thus supplying cooling currents of air to the hinge.

The hinge pintle 38 is provided with a cavity in its upper end, as shown at 237 which may be employed as an oil-supply reservoir, or which may receive an oil or grease cup. The lower end of said cavity connects with a vertical groove 238 in said pintle, which groove connects at its lower end with a groove 239 circumferential of the pintle. 240 represents an inclined passage leading through the frame 9 to the exterior of the sleeve 119, thus lubricating the hinge of the finishing mold.

241 represents horizontally disposed sleeves cast integral with the frame 9 on either side and adapted to be engaged by the chain hooks of a hoist or crane for lifting the unit into or out of position in the machine.

The machine, as above described, provides for the employment of compressed air admitted to the upper end of the parison mold to compact the mold charge in the neck ring and in the lower end of said mold.

In my pending patent application, Serial Number 349,445, filed January 5, 1920, I show the employment of vacuum or suction from below through the neck ring for this purpose.

Either method may be employed, but, as is later explained, I prefer to use both in the machine which is the subject of my present application.

Thus the valve ring 217 is provided with ports 242 connecting with its annular groove 220, each of said ports being positioned slightly in advance of each of the compressed air ports to which the pipes 220a are connected, a valve 225 being interposed in the groove 220 between said ports to block the groove and cut off communication between the ports.

Each of the ports 242 is connected by a valved-pipe, not shown, to a vacuum pump or other suitable suction device.

Thus previous to the application of compressed air to the lower end of the neck ring to expand the parison in the parison mold, an application of vacuum is made to the lower end of the neck ring, to facilitate the descent of the mold charge into the parison mold and assist in compacting it in the neck ring.

The application of vacuum is timed to begin as the mold charge is dropped or slightly before it drops into the mold, and it preferably continues during the application of compressed air to the top of the mold charge after the mold plug has been inserted into the upper end of the mold.

The parison molds may be provided with integral flaring or funnel-shaped upper ends, or the funnels may be separate elements, as shown, each mold part being provided with a funnel part or half 42a mounted on the mold part and sustained in position thereon, as by tongue and groove engagement, as shown in Fig. 18.

While the principles of my invention and many of the structural features embodied therein are applicable to machines wherein the mold support is rotated in an intermittent or step by step manner, I have particularly designed the machine and the various mechanisms forming parts or elements thereof for the continuous rotation of the mold support.

Thus the mold support may be continuously rotated by means of a power-shaft 243 carrying a pinion 244 which meshes with the perimetrally disposed cog teeth 245 of the annular plate 210 which is in fixed relation to the hub 6.

The general operation of each individual unit of my improved machine is substantially as follows.

As the unit approaches the point of feed, the parison mold has been closed with the neck ring positioned beneath it, the plunger is elevated, and the top-closure plug swung to one side into its inoperative position.

The blow mold has been previously closed with its bottom elevated in position, and the blow-head is seated in capped relation with the top of the blow mold, and the previously formed parison is being blown to final form.

Vacuum is applied to the lower end of the neck ring just before the parison mold passes beneath the feed orifice of the feeder, thus evacuating all gases which may be contained in the mold, such, for instance, as gases from burning oil, or air-leakage, or the like.

The mold charge is dropped into the open top of the parison mold and its descent therein is accelerated by the vacuum or suction in the mold, thus assisting the downward travel of the molten glass and preventing its lodging or sticking in the mold before it properly settles.

Then the top closure plug is swung over and inserted down into the upper end of the mold to the proper degree to give the parison the desired length, and compressed air is admitted to the upper end of the parison mold to compact the glass and properly form the neck between the inner contour of the neck ring and the plunger bit.

The applications of vacuum from below and compressed air from above are then preferably continued simultaneously.

The formation of the neck for the parison is thus the joint function of the application of vacuum from below and compressed air from above. The difficulty in employing vacuum alone for this purpose is that sometimes the molten glass in the mold is too stiff to be formed by vacuum before the glass begins to set and the cavities or recesses in the neck ring which are more difficult to properly fill, may not be completely filled with the glass. This is due largely to the limitations of commercially practical vacuum.

These possible failures on the part of vacuum are compensated for by the subsequent application of compressed air, which completes the proper filling of the neck ring cavities or recesses. This insures the perfect formation of screw-threads, heads &c on the parison neck.

On the other hand, if the application of vacuum is omitted and compressed air alone employed for compacting, there is danger of the mold charge sticking and hanging in the mold when dropped, and this can not be reliably overcome by the mere application of compressed air from above; but to insure uniformly perfect results vacuum should be employed as above described.

Again an interval necessarily elapses between the entry of the mold charge into the mold and the application of compressed air to the upper end of the mold, thus affording the glass an opportunity to set before the neck ring is properly filled. This is a very important matter where quick-setting glass, such as "Pyrex" glass is being worked.

Meanwhile the blowing operation is being continued in the blow mold.

The vacuum is now cut off from the lower end of the neck ring and the compressed air from the upper end of the parison mold, and after a sufficient interval to permit substantially normal atmospheric pressure to be reestablished in their stead is allowed to elapse, the plunger is depressed, leaving an axial cavity in the lower end of the mold charge.

After a sufficient interval to permit the hot glass to reheat the chilled walls of the cavity, blowing pressure is applied to the lower end of the neck ring, expanding said cavity until the glass is blown against the walls of the mold and up against the mold plug.

About the time the expansion of the mold charge in parison form has been completed, the blow-head is swung up and away from the blow mold, the latter is opened and its bottom tilted to discharge the finished ware therefrom. The bottom is then promptly raised and held in its closed position.

After the expanded parison has had sufficient time to set in the parison mold, the mold plug is moved up out of the upper end of the mold and to one side out of the way. The parison mold is then opened and the transfer operated to swing the parison, carried by the neck ring, through an arc of substantially 180° into a position wherein it depends within the open blow mold.

The blow mold is then closed, and after a predetermined interval sufficient to permit the proper stretching of the parison and to allow the parison to come to rest in a vertical position, the neck ring is opened and the transfer operated to restore the neck ring to its position beneath the parison mold.

The parison in the blow mold is now suspended by its neck from the neck of the blow mold. The blow-head is then swung into capped relation with the upper end of the blow mold and the blowing of the parison to finished form initiated at the predetermined moment.

Meanwhile, the parison mold has been reclosed above the neck ring and the plunger elevated.

In the embodiment shown substantially one and a half rotations of the mold table is required for the completion of a full cycle of operation of which approximately a half rotation is employed in forming the parison.

This completes the cycle of operation and the same is repeated, the mechanisms being automatically operated as the mold support rotates.

In the foregoing I have described the neck ring opened to deposit the parison in the blow mold before the blow head is swung into its capped position. This method of operation is employed where the parison has an exterior lip or head sufficient for its suspension in the blow mold. However in the case of a smooth neck parison or a parison without such a sufficient lip or head, I may and preferably do hold the parison suspended from the neck ring in the blow mold during the final blowing operation, the blow head being lowered into capped relation with the neck ring which remains superimposed on the blow mold until the finishing blow has been completed. The neck ring is then returned to its position below the parison for the next parison-forming operation.

In the preferred embodiment of the principles of my present invention, the mold support is in continuous rotation, but if desired such rotation may be of an intermittent or step by step character, the operation being performed while the mold support is in motion.

What I desire to claim is:—

1. In a glass fabricating machine, the combination with a rotary mold support provided with a plurality of radially disposed arms, said arms being in substantially the same horizontal plane, of a plurality of fabricating units, each unit including an inverted parison mold, a neck mold and a blow mold, interposed between adjacent arms and supported in place thereby.

2. In a glass fabricating machine, the combination with a rotary mold support provided with a plurality of radially disposed arms, said arms being in substantially the same horizontal plane, of a plurality of fabricating units each unit including an inverted parison mold, a neck mold and a blow mold, interposed between adjacent arms and supported in place thereby, said arms being provided with means for discharging cooling drafts of air against said fabricating units.

3. In a glass fabricating machine, the combination with a rotary mold support provided with a plurality of radially disposed arms, of a plurality of unitary fabricating mechanisms carried by said arms, said units comprising a frame composed of an upper and a lower frame-member which are connected together, a parison mold mounted on the upper frame member, a finishing mold mounted on the lower frame-member, a transfer device working between said molds, means for closing the upper end of the parison mold, means for fabricating the parison from below in said parison mold, and means for blowing the parison in final form in said finishing mold, all of said means being operated by the rotary movement of said mold support.

4. In a glass fabricating machine, the combination with a rotary mold support provided with a plurality of radially disposed arms, of a plurality of unitary fabricating mechanisms carried by said arms, said units comprising a frame composed of an upper and a lower frame-member which are connected together, a parison mold mounted on the upper frame-member, a finishing mold mounted on the lower frame-member, a transfer device working between said molds, means for closing the upper end of the parison mold, means for fabricating the parison from below in said parison mold, and means for blowing the parison in final form in said finishing mold, all of said means being operated by the rotary movement of said mold support, said fabricating mechanism being adapted to be installed in and removed from the machine as assembled units.

5. In a glass fabricating machine, the combination with a rotary mold support provided with a plurality of radially disposed arms, of a plurality of unitary fabricating mechanisms carried by said arms, said units comprising a frame composed of an upper and a lower frame-member which are connected together, a parison mold mounted on the upper frame-member, a finishing mold mounted on the lower frame-member, a transfer device working between said molds, means for closing the upper end of the parison mold, means for fabricating the parison from below in said parison mold, and means for blowing the parison in final form in said finishing mold, all of said means being operated by the rotary movement of said mold support, said fabricating mechanisms being adapted to be installed in and removed from the machine as assembled units, said unitary mechanism being automatically connected up, for operation by the rotation of the mold support, by being placed on the said arms.

6. In a glass fabricating machine, the combination with a rotary mold support provided with a plurality of radially disposed arms, said arms being in substantially the same horizontal plane, of a plurality of unitary fabricating mechanisms mounted on said support between said arms, each unit including an inverted parison mold, a neck mold and a blow mold, said mechanisms being adapted to be mounted on and removed from said support as units without assemblage or disassemblage.

7. In a glass fabricating machine, the combination with a mold support provided with a plurality of radially disposed arms, said arms being in substantially the same horizontal plane, of a plurality of frames supported between said arms, and fabricating mechanisms including a parison mold, a neck mold and blow mold assembled in said frames, said frames and fabricating mechanisms being adapted for installation in and removal from said support as unitary structures.

8. In a glass fabricating machine, the combination with a mold support provided with a plurality of radially disposed arms, said arms being in substantially the same horizontal plane, of a plurality of frames supported between said arms, and fabricating mechanisms including a parison mold, neck mold and blow mold assembled in said frames, said frames and fabricating mechanisms being adapted for installation in and removal from said support as unitary structure, said arms being provided with air passages for the discharge of cooling drafts against said fabricating mechanisms.

9. In a glass fabricating machine, the combination of a central column, a mold support comprising a chambered hub rotarily mounted on said column, hollow arms radiating from said hub and having chambered communication therewith, fabricating mechanism removably mounted as units on said arms, and means whereby cooling drafts of air are distributed from said hub through said arms to said fabricating mechanisms.

10. In a glass fabricating mechanism, the combination of a chambered column, a mold support comprising a hollow hub rotarily mounted on said column and having interior communication therewith, arms radiating from said hub, said arms being hollow and having interior communication with said hub, fabricating mechanisms removably mounted as units on said arms, means for supplying air under pressure to the interior of said column, and means for discharging drafts of air from the interior of said arms against said fabricating mechanisms.

11. In a glass fabricating machine, in combination with a movable mold support having a parison mold and a finishing mold mounted thereon, a supporting plate pivotally mounted on said support between said molds and provided with an opening adapted to alternately register with the fabricating end of either mold, a pair of neck ring holders hingedly mounted against one of the faces of said plate, means for opening and closing said holders, and neck ring parts carried by said holders, said neck ring parts adapted to transfer the naked parison from the parison mold to the finishing mold.

12. In a glass fabricating machine, in combination with a movable mold support having a parison mold and a finishing mold mounted thereon, a supporting plate pivotally mounted on said support between said molds and provided with an opening adapted to alternately register with the fabricating end of either mold, a pair of neck ring holders hingedly mounted against one of the faces of said plate, means for opening and closing said holders, neck ring parts carried by said holders, said neck ring parts adapted to transfer the naked parison from the parison mold to the finishing mold, and means for holding said holders snugly against said supporting plate.

13. In a glass fabricating machine, in combination with a movable mold support having a parison mold and a finishing mold mounted thereon, a supporting plate pivotally mounted on said support between said molds and provided with an opening adapted to alternately register with the fabricating end of either mold, a pair of neck ring holders hingedly mounted against one of the faces of said plate, means for opening and closing said holders, neck ring parts carried by said holders, said neck ring parts adapted to transfer the naked parison from the parison mold to the finishing mold, and means for locking said neck ring members in their closed position.

14. In a glass fabricating machine, in combination with an inverted partible parison mold and a partible finishing mold, a member pivotally mounted to swing between said mold, a pair of neck ring holders hingedly mounted on said member, partible neck ring parts mounted on said holders and adapted by the movement of said member to be alternately positioned in registration with the lower end of said parison mold and the upper end of said finishing mold, said neck ring parts adapted to transfer the naked parison from the parison mold to the finishing mold, and means for holding said holders snugly against said member.

15. In a glass fabricating machine, the combination of a movable support, a partible finishing mold carried by said support, means for opening and closing said finishing mold, a blow-head adapted to be positioned on said mold, means for moving said blow-head into or out of position on said mold, and means whereby when said blow-head abnormally resists movement it is automatically disconnected from its moving means.

16. In a glass fabricating machine, the combination of a movable support, a partible finishing mold carried by said support, means for opening and closing said finishing mold, a blow-head adapted to be positioned on said mold, means operated by the movement of said support for moving said blow-head into or out of position on said mold, and means whereby when said blow-head abnormally resists movement it is automatically disconnected from its moving means.

17. In a glass fabricating machine, the combination of a mold, a blow-head adapted to be brought into engagement with the open end of said mold, means for moving said blow-head into and out of engagement with said mold, and means whereby when the blow-head abnormally resists movement it is disconnected from its moving means.

18. In a glass fabricating machine, the combination of a movable mold support, a mold carried by said support, a blow-head adapted to be brought into engagement with the open end of the mold, an oscillatory member, means whereby said member is oscillated by the movement of said support, and an automatically releasable connection between said member and said blow-head whereby said blow-head is moved into and out of engagement with said mold.

19. In a glass fabricating machine, the combination of a movable mold support, a mold carried by said support, a blow-head adapted to be brought into engagement with the open end of the mold, an oscillatory member, means whereby said member is oscillated by the movement of said support, operative connection between said member and said blow-head whereby said blow-head is moved into and out of engagement with said mold, and means whereby when the blow-head abnormally resists movement it is disconnected from said member.

20. In a glass fabricating machine, the combination of a mold, a blow-head adapted to be brought into engagement with the open end of said mold, a pivotally mounted lever upon which said blow-head is mounted, a member pivotally mounted on the same axis as said lever, means for oscillating said member, and an automatically releasable connection between said member and said lever whereby they are oscillated in unison.

21. In a glass fabricating machine, the combination of a mold, a blow-head adapted to be brought into engagement with the open end of said mold, a pivotally mounted lever upon which said blow-head is mounted, a member pivotally mounted on the same axis as said lever, means for oscillating said member, and operative connection between said member and said lever whereby they are oscillated in unison but when said blow head abnormally resists movement said member and said lever become disconnected.

22. In a glass fabricating machine, the combination of a mold, a blow-head adapted to be brought into engagement with the open end of said mold, a pivotally mounted lever upon which said blow-head is mounted, a member pivotally mounted on the same axis as said lever, means for oscillating said member, and a spring-dog connection between said member and said lever.

23. In a glass fabricating machine, the combination of a movable support, a parison mold carried by said support, the upper end of said mold being open to receive the charge of molten glass and the parison being fabricated therein from below, a closure adapted to be brought into engagement with the upper end of said mold for the fabricating operation, a carrier for said closure, a shaft mounted for rotary movement upon which said carrier is mounted, means whereby said shaft is rotated by the movement of said support, a second shaft mounted for longitudinal movement and operatively connected to said carrier, and means whereby said second shaft is moved by the movement of said support.

24. In a glass fabricating machine, the combination of a movable mold support, a parison mold, open at its upper end for the reception of the mold charge of molten glass, carried by said support, a neck ring positioned beneath said mold, a plunger operated by the movement of the mold support and coacting with the neck ring to form the neck of the parison, means controlled by the movement of the support for blowing the parison in said mold, and means whereby when the plunger abnormally resists movement it is disconnected from its operating means.

25. In a glass fabricating machine, the combination of a support provided with a seat, a partible parison mold carried by said support, said mold being open at the top to receive the mold charge of molten glass and the parison being fabricated therein from below, a movable neck ring occupying said seat below said mold, a vertically movable plunger adapted to coact with said neck ring, and means for discharging compressed air into said seat to clear the same of obstruction.

26. In a glass fabricating machine, the combination of a support provided with a seat, a neck-ring adapted to be moved into position in said seat, a parison mold adapted to be positioned above said neck-ring, means for fabricating the parison from below in said neck-ring and mold, and fluid pressure means for cleaning said seat of foreign matter.

27. In a glass fabricating machine, the combination of a support provided with a seat, a neck-ring adapted to be moved into position in said seat, a partible parison mold carried by said support and adapted to be closed over said neck-ring, means for fabricating the parison in said neck-ring and mold, and automatically actuated means for cleaning foreign matter from said seat.

28. In a glass fabricating machine, the combination of a support provided with a seat, a neck-ring adapted to be moved into position in said seat, a partible parison mold carried by said support and adapted to be closed over said neck-ring, means for fabricating the parison in said neck-ring and mold, and fluid-pressure means for cleaning foreign matter from said seat.

29. In a glass fabricating machine, a rotary mold support provided with a plurality of radially disposed arms in substantially the same horizontal plane, a plurality of fabricating units, each of said units including an inverted parison mold, a finishing mold, and a neck ring by which the naked parison is transferred from the inverted parison mold to the finishing mold, said fabricating units interposed between adjacent arms and supported in place thereby.

Signed at Swissvale, Pa., this 24th day of September, 1925.

WILLIAM J. MILLER.